United States Patent
Schreiber et al.

[11] Patent Number: 5,708,334
[45] Date of Patent: Jan. 13, 1998

[54] METHOD FOR CONTROLLING AN ELECTRIC DRIVE OF A VEHICLE

[75] Inventors: Rolf Schreiber, Mannheim; Rüdiger Kögel, Karlsdorf-Neuthard; Peter Hildenbrand, Renchen, all of Germany

[73] Assignee: ABB Research, Ltd., Zurich, Switzerland

[21] Appl. No.: 596,913

[22] Filed: Mar. 13, 1996

Related U.S. Application Data

[63] Continuation of Ser. No. 230,638, Apr. 21, 1994, abandoned.

[30] Foreign Application Priority Data

Apr. 21, 1993 [DE] Germany ............... 43 12 949.8

[51] Int. Cl.$^6$ ............................................. H02P 7/00
[52] U.S. Cl. .................... 318/432; 318/434; 318/52; 180/197; 246/168.1
[58] Field of Search .......................... 318/437, 432, 318/52; 180/197, 65.1–65.8; 246/168.1, 187 R

[56] References Cited

U.S. PATENT DOCUMENTS

| | | | |
|---|---|---|---|
| 4,485,443 | 11/1984 | Knodler et al. | 364/424.1 |
| 4,588,932 | 5/1986 | Riondel | 318/52 |
| 4,615,618 | 10/1986 | Bailey et al. | 356/152 |
| 4,818,927 | 4/1989 | Hino et al. | 318/798 |
| 4,915,328 | 4/1990 | Nakamoto | 246/186 |
| 5,267,161 | 11/1993 | Kallenbach et al. | 364/424.05 |

FOREIGN PATENT DOCUMENTS

| | | |
|---|---|---|
| 342645 | 4/1978 | Austria. |
| 0195249 | 9/1992 | European Pat. Off.. |
| 2401709 | 7/1975 | Germany. |
| 3508447 | 9/1986 | Germany. |

Primary Examiner—David S. Martin

[57] ABSTRACT

A method for open-loop and closed-loop control of an electric drive of a vehicle, in particular of a rail vehicle, utilizes a frictional engagement between a wheel and a rail or an underlying surface, to a high degree. A control is carried out which takes into account a gradient of a characteristic frictional engagement line. The system operates with a substitute variable for the gradient, which can be detected by a technical measurement, and a set torque value which is prescribed by the operator being limited in such a way that a travel/braking mode is achieved at an optimum, prescribed operating point of the characteristic frictional engagement line.

9 Claims, 3 Drawing Sheets

METHOD FOR CONTROLLING AN ELECTRIC DRIVE OF A VEHICLE

This application is a continuation of application Ser. No. 08/230,638, filed Apr. 21, 1994 now abandoned.

BACKGROUND OF THE INVENTION

FIELD OF THE INVENTION

The invention relates to a method for closed-loop control of an electric drive of a vehicle utilizing frictional engagement between a wheel and a rail or an underlying surface, to a high degree. Such methods are used in particular in rail vehicles but can also, fundamentally, be used in road vehicles.

There have been efforts for a relatively long time not only to avoid skidding and slipping states with the aid of anti-skid devices but also to permit a travel/braking mode in a stable region just before a maximum frictional engagement. The difficulty of achieving the aimed-at operating region resides in the fact that the frictional engagement which depends on a series of influences, and is also variable during travel mode, cannot be directly measured. That means that the respectively valid characteristic frictional engagement line which specifies the relation between the coefficient of frictional engagement and the slip speed is not known.

Such problems and an explanation of the terms used by a specialist in that connection as well as possible ways of reaching conclusions indirectly as to the respectively achieved operating point, are presented in the publication AET (38)-1983, pp 45 to 56. However, the slip control described therein requires previous precise measurement of the actual speed of the vehicle, and also cannot ensure optimum operation because the maximum torque cannot be transmitted at a constant slip value. The maximum coefficient of frictional engagement, such as for a dry rail, occurs at a different slip speed than for a wet rail.

Published European Application No. 01 95 249 B1 discloses a method which operates without measurement of the vehicle speed, for determining skid states and slip states in vehicles. In that method, an identification signal is superimposed on the set control value for an electric vehicle drive, as a result of which an alternating torque is superimposed on the operating torque produced by an engine. The reaction of the mechanical system to that excitation is detected, for example with a tachometer generator, at a suitable point of the mechanical drive system, for example at the engine shaft or the drive wheel. An alternating voltage from which a measurement signal can be acquired by filtering, is output by the tachometer generator and the measurement signal is compared with the identification signal fed into the drive system, for example with the aid of a correlation calculation. It can be determined whether a skid state or a slip state is present by evaluating the result of the correlation calculation.

SUMMARY OF THE INVENTION

It is accordingly an object of the invention to provide a method for closed-loop control of an electric drive of a vehicle, which overcomes the hereinafore-mentioned disadvantages of the heretofore-known methods of this general type and which permits good utilization of frictional engagement, which is a better utilization than with known methods.

With the foregoing and other objects in view there is provided, in accordance with the invention, a method for closed-loop control of an electric drive of a vehicle, in particular of a rail vehicle, utilizing frictional engagement or adhesion between a wheel and a rail or an underlying surface, to a high degree, which comprises limiting a set torque value being prescribed operationally as a set traction force or braking force value through logical linkage or connection to a reduction signal, to a set input torque value being fed to an electric drive of a vehicle; and forming the reduction signal in a control device having a control variable being an actual value of a substitute variable being determined by technical measuring means and having a physical relation to a gradient of a characteristic frictional engagement line having been previously determined and being used to form the reduction signal.

The method has the advantage of permitting an operating point which is considered to be an optimum one and lies just in front of the maximum frictional engagement, to be prescribed, and of causing the respective optimum slip speed or the optimum slip, that is to say the relative slip speed related to the vehicle speed, to become established automatically. The method or a configuration operating according to it thus acts as a slip control with an adapted set value.

In accordance with another mode of the invention, there is provided a method which comprises forming a phase shift signal being used as the substitute variable, as follows: superimposing a preferably sinusoidal test signal on the set input torque value; measuring angular speed or angular acceleration at a mechanical output, preferably at an engine shift of the electric drive; filtering out an output-side test signal being contained in a thus obtained measurement signal, from the measurement signal; comparing the input-side and the output-side test signals for determining their phase shift, and using their phase shift as an actual value of the substitute variable; and using a test signal having such a frequency on one side and being known to have an unambiguous relation between phase shift and gradient of the characteristic line.

In accordance with a further mode of the invention, there is provided a method which comprises forming the reduction signal with a control device having integral behavior, especially a PI controller.

In accordance with a concomitant mode of the invention, there is provided a method which comprises raising a set value of the substitute variable with the aid of a modified actual value of the substitute variable, and forming the modified actual value by differentiation of the actual value with subsequent limiting on one side.

The invention is based on the idea that a clear improvement in the drive control is possible by utilizing the frictional engagement to a high degree if information relating to the gradient of the characteristic frictional engagement line is available. However, direct detection of the gradient of the characteristic frictional engagement line by technical measuring means is as impossible as is that of the characteristic line itself.

According to the invention, the system therefore operates with a substitute variable which is formed by evaluating a measured signal and which contains information relating to the gradient of the characteristic frictional engagement line. Thus, the system operates with a substitute variable having a relation to the gradient of the frictional engagement line that is known. Since this relation is known, it is not necessary to convert the substitute variable into a gradient value, that is to say the substitute variable can be used directly to control the drive.

The method which is known from Published European Application No. 01 95 249 B1 and has already been described above can be used advantageously to obtain the substitute variable. The method operates with a test signal which is also designated as an identification signal. By comparing the test signal which is fed in at the input of the electrical drive with a test signal which is detected by technical measuring means at the mechanical output, that is to say at the engine shaft or wheel shaft, a phase shift between these test signals is determined, which phase shift is utilized as a substitute variable. Instead of, or in addition to, the phase change, a change in the size of the signal can also be evaluated.

The method described in Published European Application No. 01 95 249 B1 also utilizes the phase change between input and output test signals in order to evaluate skid states. However, the present invention develops the method substantially further to the extent that the determined phase change is utilized as information relating to the gradient of the characteristic frictional engagement line, and is thus utilized indirectly to determine at what operating point of the characteristic frictional engagement line the system is currently operating. Since, in this way, the current operating point is known, the distance from a prescribed optimum operating point can be determined and a reduction signal can be formed, with the aid of which an operating set value, that is to say one which has been prescribed by a locomotive driver or engineer, can be limited to such an extent that an operating point becomes established in the region of the optimum operating point, that is of the optimum slip.

The method which is described above in abbreviated form is explained in greater detail below with reference to an electric drive of a rail vehicle.

Other features which are considered as characteristic for the invention are set forth in the appended claims.

Although the invention is illustrated and described herein as embodied in a method for closed-loop control of an electric drive of a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1A:
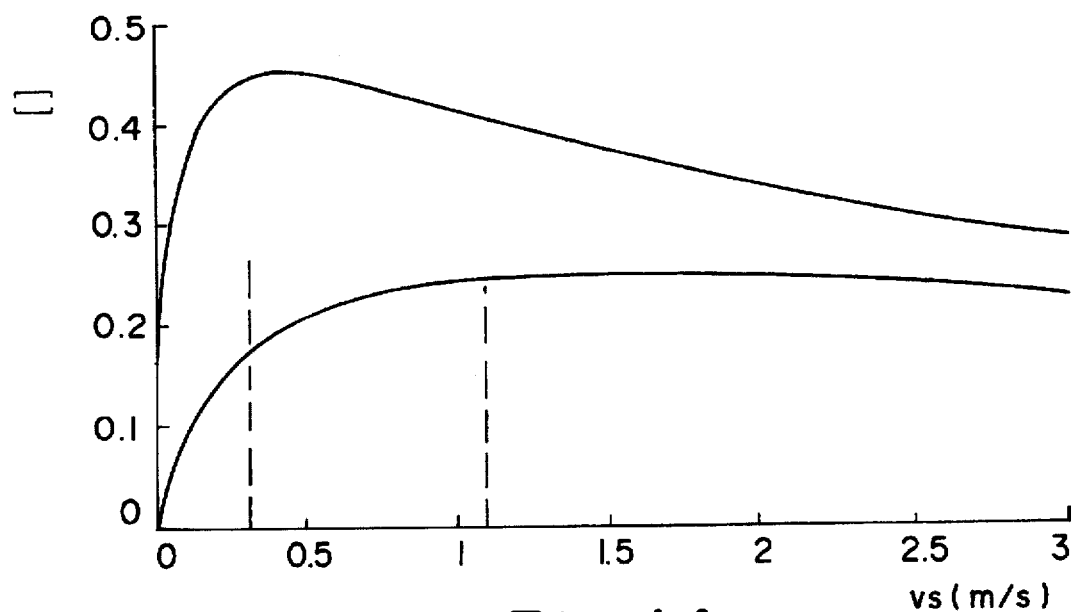
FIG. 1 includes an upper graph plotting a coefficient of frictional engagement against a slip speed, and a lower graph plotting a gradient against the slip speed.
Figure 1B:
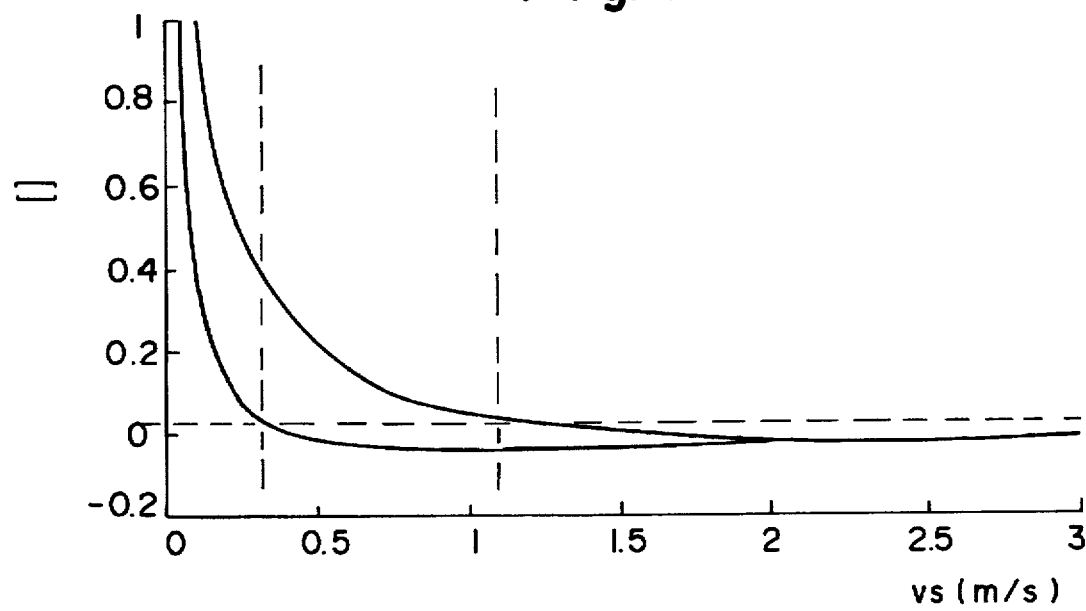

Referring now to the figures of the drawing in detail and first, particularly, to the upper part of FIG. 1 thereof, there is seen, by way of example, characteristic frictional engagement lines (coefficient of frictional engagement as a function of slip speed $v_s$) for a dry and a wet rail state. It can be seen that the maximum of the coefficient of frictional engagement lies at different slip speeds depending on the rail state. The lower part shows the gradient of the characteristic lines shown in the upper part. An advantageous operating point which can be prescribed as an optimum operating point is marked with dashed lines. As is shown by the two vertical dashed lines, this operating point lies just before the maximum point is reached in the rising part of the characteristic frictional engagement line in each case, that is to say both for a dry and a wet rail state. The horizontal dashed line marks the associated gradient value which is, for example, 0.01 or 0.02. It is significant that the same gradient value applies for both characteristic lines so that by selecting one gradient value an optimum operating point for all rail states is selected.

Since the gradient of the characteristic frictional engagement line cannot be detected by technical measuring means, a substitute variable is used having a relation to the gradient of the characteristic frictional engagement line which is known. This is namely preferably a phase shift $\Phi$ between a test signal T, which is input into the electric drive on the input side by superimposition with the set torque and an output-side test signal $T_A$ which is filtered out of an angular speed measured value w that is tapped off at the mechanical output, for example at the engine shaft. The angular acceleration can also be measured instead of the angular speed.

Figure 2:
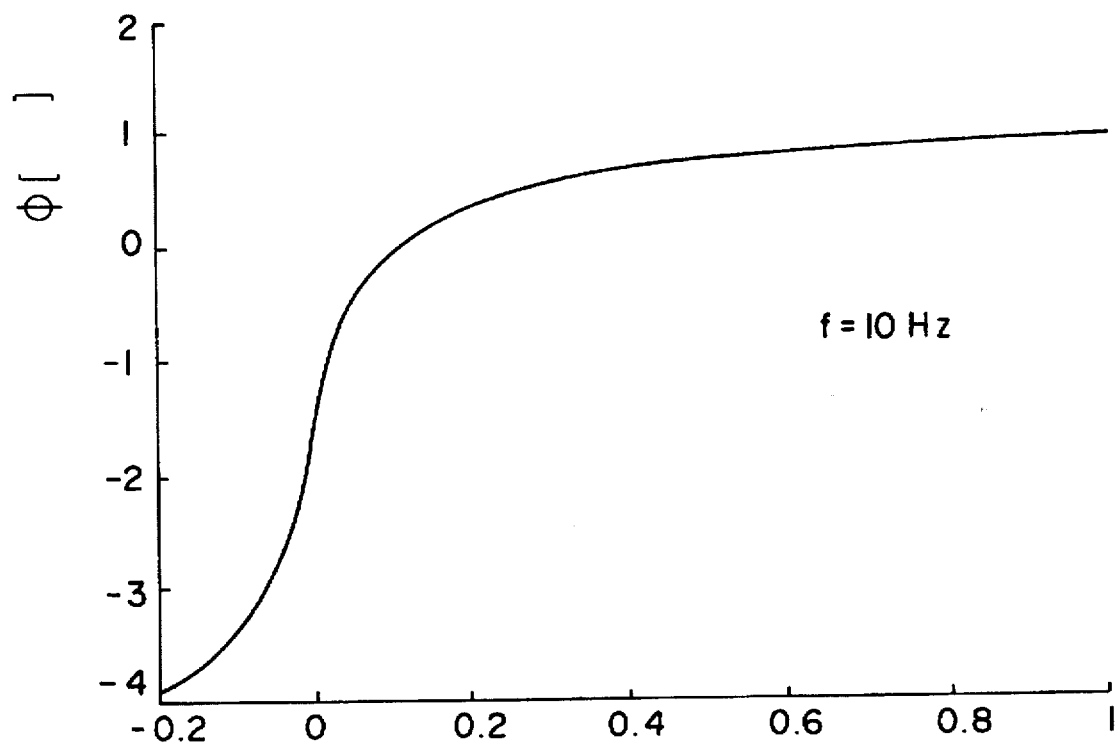
FIG. 2 is a graph plotting a phase shift against a gradient of a characteristic frictional engagement line.

The relation between the gradient of the characteristic frictional engagement line and this phase shift can be explained as follows. Engine/wheel/rail systems have a non-linear behavior due to the characteristic frictional engagement line for the wheel/rail contact. A linear system with any desired operating point on the characteristic frictional engagement line is obtained by linearizing this non-linear behavior. In this case, the gradient of the characteristic frictional engagement line constitutes a significant operating point parameter. The frequency response of the torque-dependent angular speed can be determined for each gradient. The frequency response of the non-linear engine/wheel/rail system thus constitutes a group of curves of value and phase characteristics as a function of the operating point parameter "gradient of the characteristic frictional engagement line". The characteristic frequency lines in this case show a strong dependence on the phase of the gradient of the characteristic frictional engagement line. In the case of one frequency point of the phase shift curves it is possible to determine a phase shift characteristic gradient line which has an unambiguous relation between the phase shift and the gradient. By way of example, such a characteristic line is illustrated in FIG. 2 for a test signal frequency f=10 Hz. The searched-for relation between the gradient of the characteristic frictional engagement line and the phase shift of the input torque and of the angular speed of the engine shaft of a drive system is thus found for a specific frequency of the characteristic phase shift lines of a non-linear engine/wheel/rail system.

A suitable method for using technical measuring means to determine the phase shift between a test signal which is superimposed on the set torque value and the angular speed of the engine shaft resulting therefrom has already been described above in principle and is described in detail in Published European Application No. 01 95 249 B1.

In relation to the application of the known method for determining the phase shift within the scope of the present method, two modifications are to be noted:

a) The selection of the frequency of the test signal or identification signal preferably takes place according to Published European Application No. 01 95 249 B1 in such a way that it corresponds to a resonance frequency of the mechanical drive. This aspect is insignificant in this case. The frequency which is selected as being suitable is one for which there is an unambiguous relation to the phase change of the gradient of the characteristic frictional engagement line.

b) In the method according to Published European Application No. 01 95 249 B1, preferably the angular acceleration, and in the method according to the invention preferably the angular speed, are measured and evaluated.

The determination of the phase shift signal can be carried out in principle both with a continuous or discrete correlation method, which is to say by using analog technology or by means of software implementation.

Figure 3:
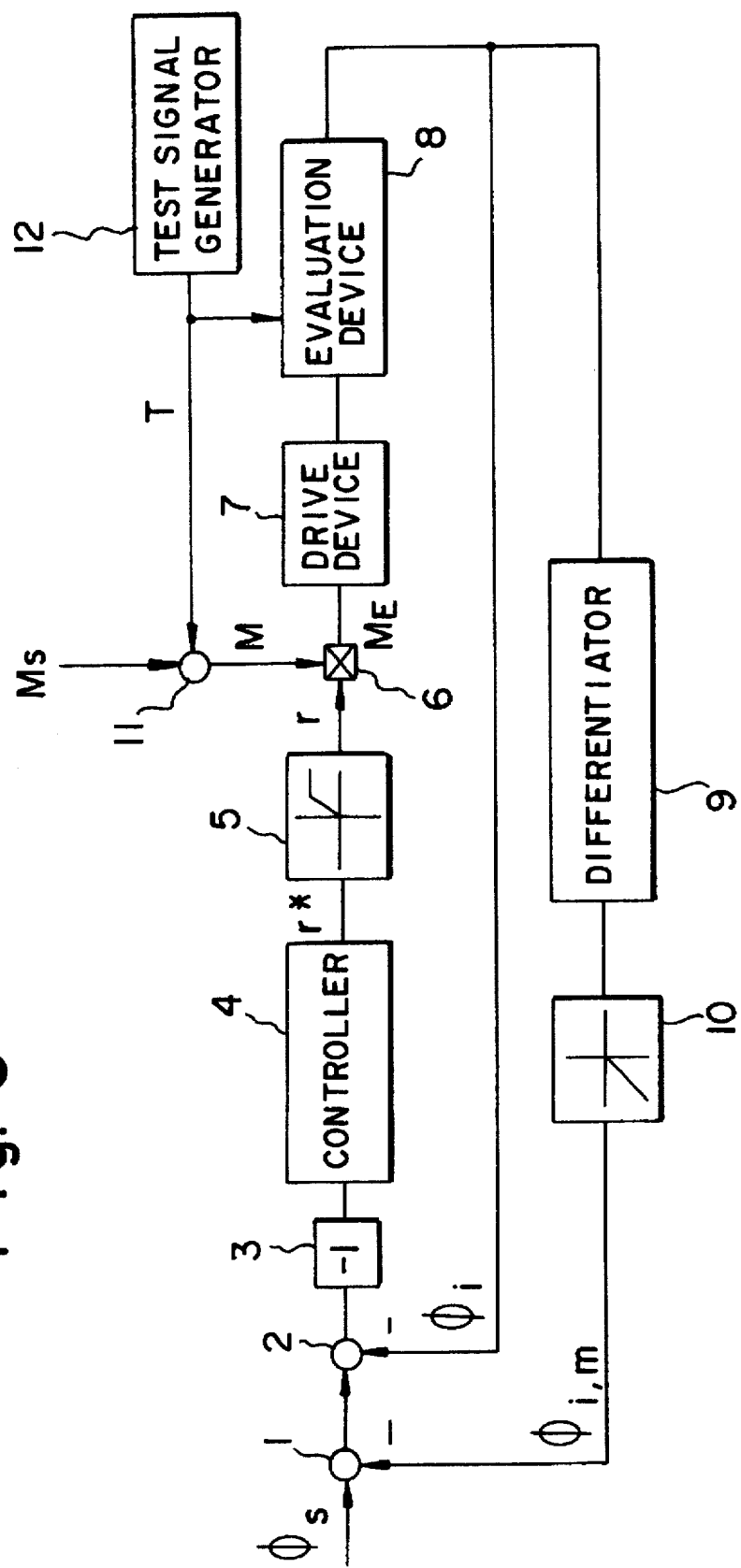
FIG. 3 is a schematic and block circuit diagram of a control structure for carrying out the method of the invention.

A control structure which is suitable for carrying out the method is illustrated by way of example in FIG. 3. A set phase shift value $\Phi_s$ is prescribed as a substitute value for a gradient value which is to be prescribed.

The set phase shift value $\Phi_s$ is to correspond to an operating point just before the maximum frictional engagement in the stable region. This is achieved if the set phase shift value $\Phi_s = -\frac{1}{2}\pi + \epsilon$ is selected in such a way that the gradient of the characteristic frictional engagement line is, for example, 0.01. The factor $\epsilon$ describes the interval from the start of the instable operating region at $\Phi = -\frac{1}{2}\pi$. A suitable interval factor can be $\epsilon = 0.5$, for example.

In the configuration according to FIG. 3, the set phase shift value $\Phi_s$ is fed to a first addition point 1 where a modified actual phase shift value $\Phi_{i,m}$ is subtracted. An actual phase shift value $\Phi_i$ is subtracted from the resulting value at a second addition point 2. The value resulting therefrom is inverted in an inverter 3 and is subsequently fed to a controller 4. The controller 4 supplies an unlimited reduction factor r* which is limited in a subsequent limiter 5 to values in the range of 0 to 1. A reduction factor r which is formed in this way is logically linked at a multiplication point 6 to a set value M, so that a corrected set input torque value $M_E$ is produced which is fed to a drive device 7. The set value M constitutes a superimposition of a set torque value $M_S$ which is prescribed, for example, by the locomotive driver or engineer and of an alternating torque which is designated as the test signal T. At the mechanical output of the drive device 7, the angular speed w is detected and fed to an evaluation device 8 which supplies the actual phase shift value $\Phi_i$ that is fed to the second addition point 2. The actual phase shift value $\Phi_i$ is additionally fed to a differentiator 9 having an output signal which is limited in a subsequent single-side limiter 10 and fed to the first addition point 1 as the modified actual phase shift value $\Phi_{i,m}$.

The test signal T is produced in a test signal generator 12 and fed both to a third addition point 11 for logical connection to the set torque value Ms and to the evaluation device 8.

A controller with internal behavior, for example a PI controller, is suitable as the controller 4. However, in principle various controllers which are known from control technology, ranging as far as a fuzzy controller, can be used.

In order to minimize the reaction time which results from the transient condition of the correlation filter of the evaluation device 8, adaptive and/or predictive structures, for example on the basis of heuristic observation (fuzzy logic/fuzzy control) or deterministic methods, can be additionally used. For example, a prediction of the phase shift can be carried out on the basis of past values. The proposed structure can operate in an autarkic fashion or else be integrated into existing anti-skid and anti-slip devices or rpm or torque controls.

Of course, the control must not increase the traction force or braking force prescribed by the operator in the form of the set torque value $M_S$. This is ensured by the limiter 5 which limits the reduction factor r* that is supplied by the controller 4 and is still unlimited to values in the range of 0 to 1.

Figure 4:
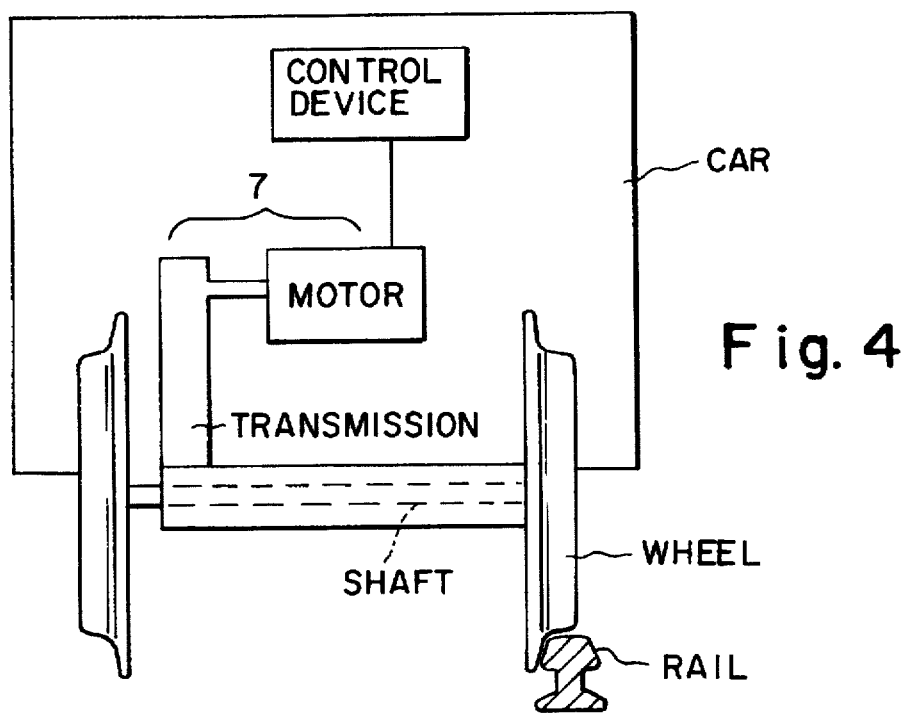
FIG. 4 is a schematic view of a rail-borne vehicle with the system of the invention.

FIG. 4 illustrates a railcar with wheels connected through an axle shaft. A control device controls a motor, which drives the wheels through a transmission.

We claim:

1. A method of controlling a drive of a vehicle, wherein a setpoint torque is prescribed for the drive of the vehicle, the method which comprises:
   reducing a setpoint torque prescribed for a drive of a vehicle to an input torque which allows an operation of the vehicle substantially at a maximum frictional engagement between the vehicle wheel and an underlying surface;
   wherein the step of reducing includes:
   a) continuously determining a curve representing a current frictional engagement between the vehicle wheel and the underlying surface;
   b) measuring a substitute variable having a defined physical relationship with a gradient of the curve, and determining the gradient of the curve from the substitute variable;
   c) forming a reduction factor from a difference between a current gradient of the curve and a predetermined set-point gradient; and
   d) forming the input torque by multiplying the setpoint torque with the reduction factor.

2. The method according to claim 1, wherein the substitute variable is a phase shift signal determined as follows:
   a) superimposing a test signal on the set input torque value;
   b) measuring angular speed or angular acceleration at a mechanical output;
   c) filtering out an output-side test signal contained in a measurement signal obtained in the step of measuring;
   d) comparing an input-side test signal and the output-side test signal and determining their phase shift, and using their phase shift as the substitute variable; and
   e) using a test signal which is known to have an unambiguous relation between phase shift and gradient of the curve.

3. The method according to claim 2, wherein the superimposing step comprises superimposing a sinusoidal test signal on the setpoint torque.

4. The method according to claim 2, which comprises measuring the angular speed or angular acceleration at the mechanical output at an engine shift of the electric drive.

5. The method according to claim 1, which comprises forming the reduction factor with a control device having integral characteristics.

6. The method according to claim 5, which comprises forming the reduction factor with a PI controller.

7. The method according to claim 1, which comprises raising a set value of the substitute variable with the aid of a modified actual value of the substitute variable, and forming the modified actual value by differentiation of the actual value with subsequent limiting on one side.

8. The method according to claim 1, wherein step a) includes determining the curve from a coefficient of friction taken as a function of a slip between the wheel and the underlying surface.

9. A method of controlling a drive of a rail vehicle of the type having wheels supported on rails and a car supported on the wheels, an electric drive motor powering the wheels, and wherein a setpoint output torque is prescribed by an operator of the rail vehicle for the electric drive motor, the method which comprises:

reducing a setpoint torque prescribed for the electric drive motor of the rail vehicle to an input torque which allows an operation of the rail vehicle substantially at a maximum frictional engagement between the wheel and the underlying rail;

wherein the step of reducing includes:

a) continuously determining a curve representing a current frictional engagement between the vehicle wheel and the underlying rail;
b) measuring a substitute variable having a defined physical relationship with a gradient of the curve, and determining the gradient of the curve from the substitute variable;
c) forming a reduction factor from a difference between a current gradient of the curve and a predetermined set-point gradient; and
d) forming the input torque by multiplying the setpoint torque with the reduction factor.

* * * * *